United States Patent [19]
O'Donnell et al.

[11] Patent Number: 5,942,267
[45] Date of Patent: Aug. 24, 1999

[54] PACKAGE FOR HEATING A PLURALITY OF SUBSTANTIALLY UPRIGHT, IN-LINE FOOD ITEMS IN A TOASTER

[75] Inventors: Hugh Joseph O'Donnell, Cincinnati; Douglas Toms, St. Bernard, both of Ohio

[73] Assignee: The Proctor & Gamble Company, Cincinnati, Ohio

[21] Appl. No.: 08/972,552

[22] Filed: Nov. 18, 1997

[51] Int. Cl.⁶ .............................. A21D 10/02; A23L 3/00
[52] U.S. Cl. ...................... 426/113; 426/110; 426/107; 426/234; 426/124
[58] Field of Search .................. 426/113, 234, 426/110, 124, 107, 106

[56] References Cited

U.S. PATENT DOCUMENTS

| | | | |
|---|---|---|---|
| 2,838,404 | 6/1958 | Cohen | 99/174 |
| 2,881,078 | 4/1959 | Oritt | 99/171 |
| 2,912,336 | 11/1959 | Perino | 99/174 |
| 2,962,957 | 12/1960 | Bork | 99/402 |
| 3,117,875 | 1/1964 | Burns et al. | 99/174 |
| 3,185,372 | 5/1965 | Ferraro | 229/3.5 |
| 3,361,576 | 1/1968 | Jacobson | 99/171 |
| 3,392,033 | 7/1968 | Thulin | 99/171 |
| 3,410,700 | 11/1968 | Gstohl | 99/192 |
| 3,442,662 | 5/1969 | Robinson | 99/171 |
| 3,446,632 | 5/1969 | LeVan | 99/171 |
| 3,469,998 | 9/1969 | Lane | 99/171 |
| 3,554,770 | 1/1971 | Lipsky et al. | 99/174 |
| 3,585,048 | 6/1971 | Uhlig et al. | 99/174 |
| 3,597,238 | 8/1971 | Scharre | 99/174 |
| 3,615,706 | 10/1971 | Robinson | 99/171 |
| 3,615,711 | 10/1971 | Markus et al. | 99/171 |
| 3,663,239 | 5/1972 | Rowe et al. | 99/171 |
| 3,672,916 | 6/1972 | Virnig | 99/171 |
| 3,741,778 | 6/1973 | Rowe | 99/171 |
| 3,759,721 | 9/1973 | Hawley | 99/171 |
| 3,836,064 | 9/1974 | Stillwagon | 229/3.5 |
| 3,873,735 | 3/1975 | Chalin et al. | 426/87 |
| 3,891,775 | 6/1975 | Murray et al. | 426/107 |
| 4,007,292 | 2/1977 | Shatila et al. | 426/637 |
| 4,051,266 | 9/1977 | Goltsos | 426/120 |
| 4,238,517 | 12/1980 | Bosley, Jr. et al. | 426/250 |
| 4,290,349 | 9/1981 | Fiorenza | 99/388 |
| 4,603,052 | 7/1986 | El-Hag et al. | 426/523 |
| 5,034,234 | 7/1991 | Andreas et al. | 426/107 |
| 5,096,723 | 3/1992 | Turpin | 426/107 |
| 5,175,404 | 12/1992 | Andreas et al. | 219/10.55 |
| 5,728,416 | 3/1998 | Bono et al. | 426/113 |

FOREIGN PATENT DOCUMENTS

| | | |
|---|---|---|
| 797651 | 10/1968 | Canada . |
| 797652 | 10/1968 | Canada . |
| 869865 | 5/1971 | Canada . |
| 88 10 550 U | 11/1988 | Germany . |
| 93 17 979 U | 3/1994 | Germany . |
| 1158988 | 7/1969 | United Kingdom . |
| WO 96/09967 | 4/1996 | WIPO . |

*Primary Examiner*—Anthony J. Weier
*Attorney, Agent, or Firm*—Jack L. Oney, Jr.

[57] ABSTRACT

A package for heating a plurality of substantially upright, in-line food items in a toaster having a trough, handle, and retainer. The trough provides support for bottom end of food items and for catching by-products when the package is used in a toaster. The handle is connected to the trough. The retainer is connected to the handle above the trough. The retainer provides support for upper end of food items. The retainer has an opening through which upper ends of the plurality of food items extend. The retainer and the handle are oriented such that the upright plane of the edges of the retainer and the handle are substantially parallel to the plane of a radiant heat source in the toaster. The retainer and the handle subject to radiant heat from the heat source are thin enough to minimize the amount of radiant heat absorbed by the retainer and the handle while maximizing the percent area of the food items exposed to the radiant heat source.

19 Claims, 2 Drawing Sheets

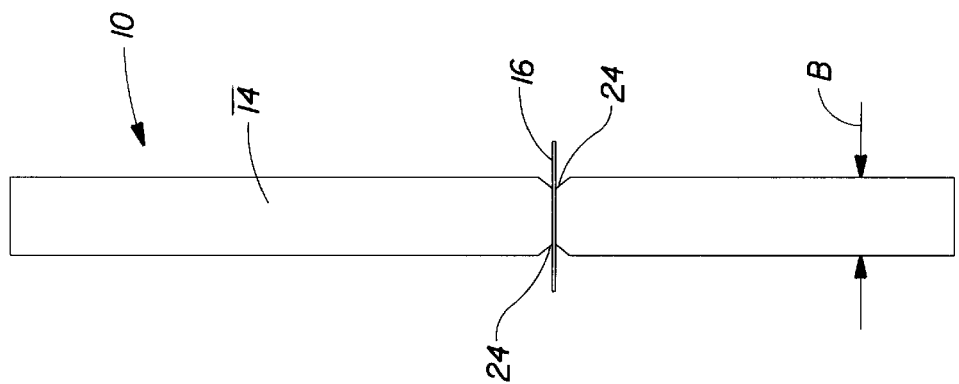
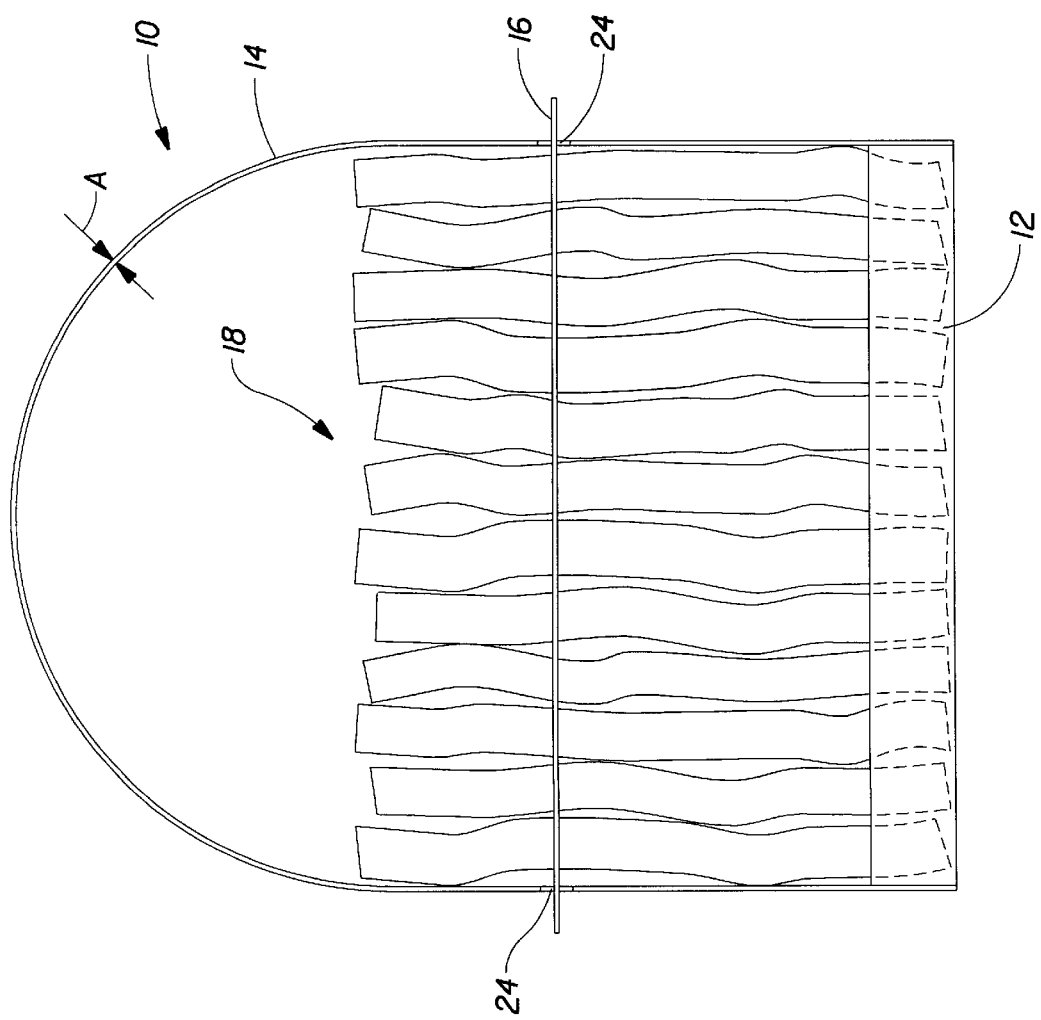

PACKAGE FOR HEATING A PLURALITY OF SUBSTANTIALLY UPRIGHT, IN-LINE FOOD ITEMS IN A TOASTER

FIELD OF THE INVENTION

The present invention relates to packages for supporting a plurality of food items which are heated simultaneously in a toaster.

BACKGROUND OF THE INVENTION

Packages for supporting food items in a toaster are commonly used for cooking various food items. Often these packages are made from inflammable materials such as metal foil (U.S. Pat. No. 3,410,700 to Gstohl and U.S. Pat. No. 3,446,632 to Le Van). The electrical safety of these packages is enhanced with the use of electrically insulating coatings (U.S. Pat. No. 3,597,238 to Scharre and U.S. Pat. No. 3,615,706 to Robinson). The heat transfer of these packages is enhanced with the use of coatings to create thermal radiation absorbing surfaces (U.S. Pat. No. 3,836,064 to Stillwagon). However, these packages typically do not permit browning of a large percent of the external food surface because these packages wholly or substantially enclose the food. Additionally, these packages are still prone to electrical hazards while in conditions of use or misuse by consumers.

Other packages are made of substantially non-conductive materials such as food dough (U.S. Pat. No. 3,585,048 to Uhlig and U.S. Pat. No. 5,525,366 to Zukerman). The dough cooks with the food and minimizes electrical or flammability hazards. However, this material is more fragile than other packaging materials. Special care may be required by the packer when loading food into the package or by the consumer when handling a partially thawed and soft package to prevent damage upon inserting the package into the toaster.

Other packages are made of paper-based material that is moistened prior to toasting (U.S. Pat. No. 3,759,721 to Hawley). The moisture contained within the packaging material protects the material by maintaining the temperature near the boiling point of water while sufficient moisture remains in the package. However, once the moisture is evaporated, the material can quickly degrade and possibly produce smoke, malodor, and fire. It has been found that the coating of a paper-based material with aluminum flake/binder is a good technique for the minimization of paper degradation and ignition under the thermal radiation conditions of a toaster. However, based on testing with a range of toaster types, it has been determined that this method does not sufficiently reduce smoking or malodor in all high temperature or rapid-heating toasters, such as the Procter Silex T620B, where temperatures can exceed 800° F.

US Pat. No. 3,597,238 to Scharre discloses a package for heating strips of bacon in a toaster. Scharre's package would not provide the desired cooking and browning effect for food items because the percent area of the food items exposed to the toaster's radiant heat would be minimal. Additionally, Scharre's package has metal foil which is a potential electrical hazard and is expensive to construct. Also, Scharre's package holds its food items in an upright position; whereas, in the present invention the food items are self-standing.

What has been missing is a package for heating a plurality of substantially upright, in-line food items in a toaster which provides a substantial percent of exposure of the external food surface area necessary for uniform browning of a plurality of food items during heating. Additionally, what has been missing is a package for heating a plurality of substantially upright, in-line food items in a toaster which provides a cost-effective package to substantially minimize the risk of electrical and flammability hazards.

SUMMARY OF THE INVENTION

In one aspect of the present invention, a package for heating a plurality of substantially upright, in-line food items in a toaster comprises a trough, handle and retainer. The trough provides support for bottom end of a plurality of food items and for catching by-products when the package is used in a toaster. The handle is connected to the trough. The retainer is connected to the handle above the trough. Alternatively, the retainer may be connected to the trough. The retainer has an opening through which upper ends of a plurality of food items extend. The retainer and the handle are oriented such that the upright plane of the edges of the retainer and the handle are substantially parallel to the plane of a radiant heat source in the toaster. The retainer and the handle subject to radiant heat from the heat source are thin enough to minimize the amount of radiant heat absorbed by the retainer and the handle while maximizing the percent area of a plurality of food items exposed to the radiant heat source. The trough is made preferably of an absorbent material to absorb the by-products. The trough, handle, and retainer are made preferably of a paper-like material for inexpensive construction.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify identical elements and wherein:

FIG. 2 is a front elevation view thereof, showing the package having a trough, a handle, and a retainer supporting the upper end of a plurality of food items; and FIG. 3 is a left side elevation view thereof, showing the narrow package adapted to fit into a toaster slot;

DETAILED DESCRIPTION OF THE INVENTION

Figure 1:
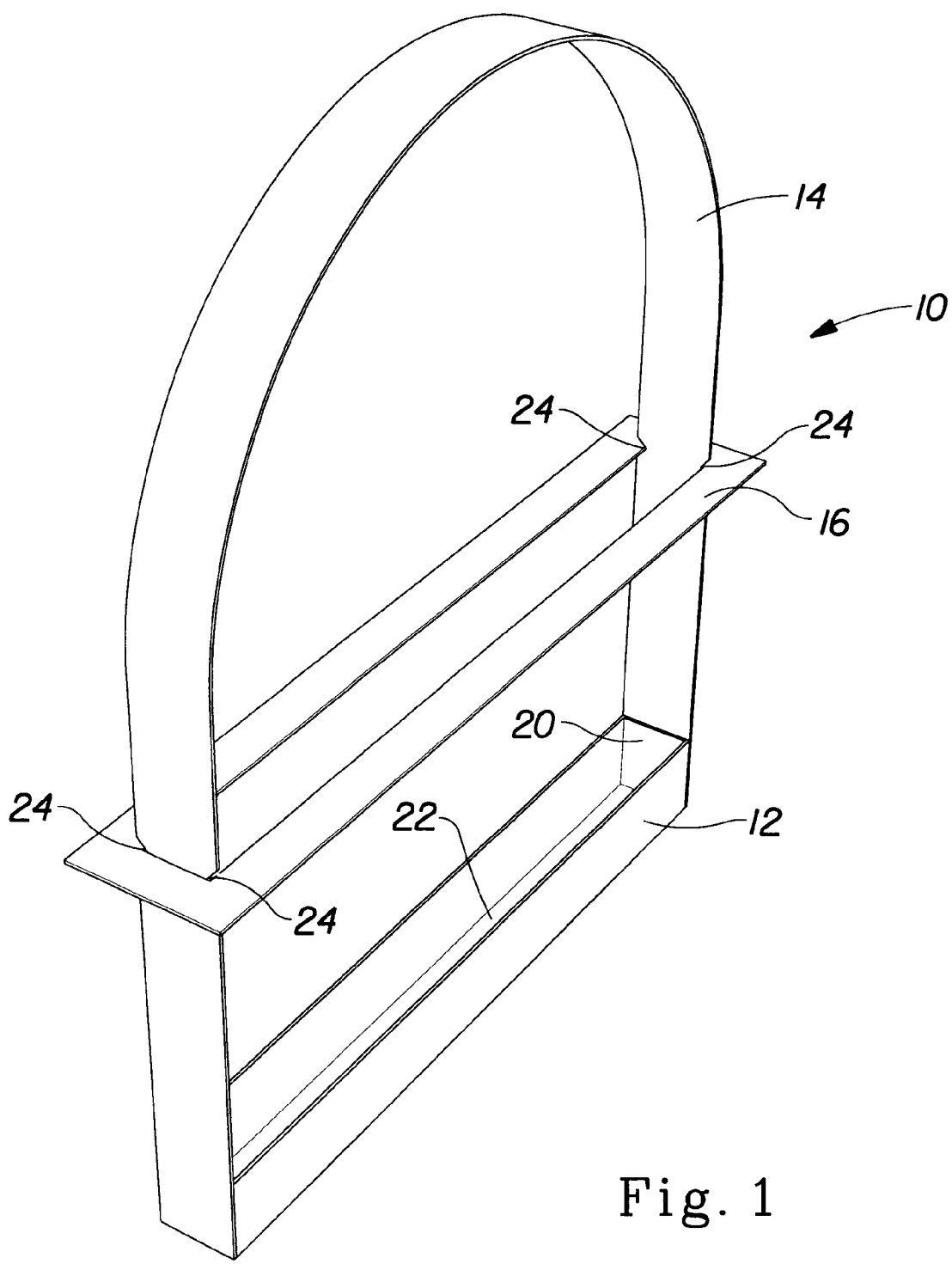
FIG. 1 is a perspective view of a preferred package of the present invention, showing a structure for heating a plurality of food items in a toaster.

Referring now to the drawings, FIGS. 1, 2, and 3, there is shown a first preferred embodiment of the present invention, which provides a package for heating a plurality of substantially upright, in-line food items in a toaster (not shown). A common toaster has at least one toaster slot. A common toaster slot has two radiant heat sources. Each radiant heat source is usually within an upright plane. The two planes of radiant heat source are usually parallel to each other and are located along the perimeter of the longest side of the toaster slot. The package is generally indicated as 10. The plurality of substantially upright, in-line food items is generally indicated as 18. Various types of substantially upright, in-line food 18 items may be used, for example French fries, fried zucchini sticks, fried potato sticks, fried cheese sticks, fried shrimp, and other self-standing, up-right food items of the like. The primary object of this invention is that by minimizing the percent area of package 10 exposed to radiant heat, the percent area of food items 18 exposed to radiant heat is maximized thus providing uniform browning of food items 18. Another object of this invention is that by minimizing the material thickness of package 10 and constructing package 10 with a geometry which minimizes the amount of surface area directly exposed to radiant heat, the amount of radiant heat absorbed by package 10 is minimized. Minimizing the amount of radiant heat absorbed by package 10 reduces the risk of combustion of package 10. Another object of this invention is minimizing the amount of radiant heat absorption by shielding package 10 with the food items 18 which are placed inside and along the interior walls of package 10. Another object of this invention is the cooling of package 10 by constructing elements of package 10 as having a high aspect ratio.

Package 10 comprises a trough 12, a handle 14, and a retainer 16. Trough 12 has a continuous perimeter wall 20 and a closed bottom 22 and is open at the top. Trough 12 provides support for bottom end of food items 18 and also catches by-products when heating food items 18 inside package 10 in a conventional upright toaster slot. Closed bottom 22 is not coated on its inside wall so that it better absorbs by-products. To provide greater structural stability for trough 12, a support member (not shown) such as a paperboard cross-member or two mechanically interlocking tabs are added to connect opposing side walls of trough 12.

Handle 14 is a continuous piece wherein the ends are connected to the ends of trough 12. In an alternative embodiment, a handle (not shown) is a noncontinuous piece wherein segments of the handle are extensions of trough 12 and the ends of the segments are connected together to form handle 14 using a staple or any other form of common mechanical connection. Handle 14 provides a grip surface for placing and removing package 10 into and out of a toaster slot (not shown).

Retainer 16 is mechanically held in place within notches 24 cut into handle 14 at an adequate height to provide support for the upper end of food items 18. Retainer 16 has an aperture for the insertion and support of food items 18. In an alternative embodiment, a multiple of parallel retainers (not shown) are used to provide additional structural stability of package 10.

Package 10 is preferably made of a 8 point clay-coated solid bleached sulfate (SBS) paperboard, a product from Westvaco Corporation, of Covington, Va. The inside surface of trough 12 is the uncoated side of material so that grease and by-products may be absorbed. The outside surface of handle 14 and upper surface of retainer 16 are the coated side of material for cosmetic reasons. Trough 12, handle 14, and retainer 16 are cut out of a sheet of material. Trough 12 and handle 14 are then connected, for example by staples or a series of mechanical interlocking slits. Installation of retainer 16 onto handle 14 requires retainer 16 to be slipped-fit around temporarily deformed handle 14 and moved into position until retainer 16 fits easily into notches 24.

It is observed that the radiant heating profile within a toaster is non uniform. Experiments show that the highest temperature within the toaster slot exists at about 1.3 centimeters from the top of the toaster and the lowest temperature within the toaster slot exists about within 2.5 centimeters from the bottom of the toaster. Based on this radiant heating profile, package 10 is designed with trough 12, which has the most material exposure, located near the bottom of the toaster slot. Additionally, based on this radiant heating profile, package 10 is designed with the arch of handle 14 located either preferably above or below 1.3 centimeters from the top of the toaster. Also from these experiments it is recorded that the average toaster heating temperature near the top of the toaster is about 600° F. Using this information, a flammability study was conducted and concluded that after 7 minutes the grease from French fries may combust. Package 10 did not combust in this period. French fries are adequately heated and browned within only 2–3 minutes of heating in a toaster; thus, combustion would not be expected.

It is also observed from experimentation that the use of par-fried French fries and commercially available microwave fries produce excellent tasting French fries when used in the package of the present invention in a toaster. Par-fried French fries are described in commonly owned U.S. application Ser. No. 08/668,487 to Bono et al., entitled "CONTAINER FOR HEATING FROZEN FRENCH FRIES IN A TOASTER", which was filed on Jun. 21, 1996 and is incorporated herein by reference . The microwave fries used were FRIES-TO-GO™, a product of Inland Valley, of Tri-Cities, Wash.

An important feature of handle 14 and retainer 16 is a high aspect ratio. The aspect ratio is calculated as B divided by A, wherein A is the dimension of the surface which is parallel to the toaster radiant heat source and B is the dimension of the surface which is perpendicular to the toaster radiant heat source. The dimension of the surface which is parallel to the radiant heat source, A, represents the thickness of the paperboard (See FIG. 2). The dimension of the surface which is perpendicular to the radiant heat source, B, represents the width of handle 14 (See FIG. 3). It is believed that the reasons for the success of the high aspect ratio in avoiding burning the packaging material are based on heat transfer principles. The first heat transfer principle is to minimize the amount of radiant heat per time which is absorbed into package 10 and maximize the amount of radiant heat per time which is released from package 10. This principle is important because too much radiant heat within package 10 will cause it to combust. The second heat transfer principle is that less radiant heat per time is absorbed from a source into a smaller surface than a larger surface. This principle is applicable in that the paperboard thickness is substantially smaller than the paperboard width and therefore the paperboard edges absorbs less radiant heat per time than the paperboard width surfaces. The third heat transfer principle is that heat is conducted from warmer to cooler regions. This principle is applicable in that the radiant heat which is absorbed by the surface of dimension A is conducted away into the cooler material along dimension B. Thus, the high aspect ratio allows handle 14 to act like a typical cooling fin such as used in cooling electronic components. The fourth heat transfer principle is that a surface may be shielded by another material to inhibit radiant heat exposure and absorption. This principle is applicable in that food items 18, which is located within and along the interior walls of package 10, absorb and shield the radiant heat source that would otherwise be absorbed by package 10. The heat transfer principles of handle 14 also apply to retainer 16.

The design of handle 14 is limited also by its structural integrity. Therefore, a balance between aspect ratio and structural integrity is needed. To insure the structural integrity of package 10, the minimum value for the paperboard thickness is about 0.01 centimeters. The preferred value for the paperboard thickness is between about 0.01 centimeters and about 0.05 centimeters. The most preferred value for the paperboard thickness is 0.02 centimeters. The ideal thickness of the packaging material will be limited by its mechanical and thermal properties such as modulus of elasticity, yield strength, conductivity and thermal absorptivity. Thus, the best thickness will be dependent upon the packaging material selected for the construction of package 10.

Package 10 dimensions are about 14.61 centimeters tall, about 11.75 centimeters long, and about 1.59 centimeters wide. The width of package 10 is critical because it is slightly narrower than an average toaster slot thus resulting in an upright posture of package 10. The upright posture of package 10 is critical to ensure the plane of package 10 and the plane of the radiant heat source are parallel to minimize the percent area of package 10 exposed to the radiant heat. Continuous perimeter wall 20 is about 1.74 centimeters tall, which is an adequate height to contain grease and by-products. Retainer 16 is positioned about 7.62 centimeters from bottom of package 10, which is an adequate height for supporting the upper end of food items 18.

While particular embodiments of the present invention have been illustrated and described, it will be obvious to those skilled in the art that various changes and modifications may be made without departing from the spirit and scope of the invention, and it is intended to cover in the appended claims all such modifications that are within the scope of the invention.

What is claimed is:

1. A package for heating a plurality of substantially upright, in-line food items in a radiant heat producing toaster, comprising:

a) a support member providing support for bottom end of food items;

b) a handle connected to said support member;

c) a retainer providing support for upper end of the food items, said retainer connected to said package, said retainer and said handle being oriented such that a plane of edges of said retainer and said handle are substantially parallel to a plane of a radiant heat source in the toaster, said retainer and said handle constructed from a material having a thickness between about 0.01 centimeters and about 0.05 centimeters which is thick enough to provide structural integrity and thin enough to minimize the amount of radiant heat absorbed by said retainer and said handle thus reducing the risk of combustion of said package while maximizing a percent area of the plurality of food items exposed to the radiant heat source thus providing uniform browning of the food items.

2. The package of claim 1, wherein said handle and said retainer have an aspect ratio between about 30 and about 160.

3. The package of claim 1, wherein the support member is a trough providing support for bottom end of food items and for catching by-products when the package is used in a toaster.

4. The package of claim 1, wherein the support member is made of a paper-like material.

5. The package of claim 1, wherein the support member is made of an absorbent material to absorb by-products.

6. The package of claim 1, wherein the handle is made of a paper-like material.

7. The package of claim 1, wherein the retainer has an opening through which upper ends of the food items extend.

8. The package of claim 1, wherein the retainer is made of a paper-like material.

9. The package of claim 1, wherein the retainer is connected to the support member.

10. The package of claim 9, wherein the retainer has an opening through which upper ends of the food items extend.

11. The package of claim 1, wherein the retainer is connected to the handle above the support member.

12. The package of claim 11, wherein the retainer has an opening through which upper ends of the food items extend.

13. The food items of claim 1, wherein the food items may be selected from the group consisting of French fries, fried zucchini sticks, fried potato sticks, fried cheese sticks, fried shrimp.

14. A package for heating a plurality of substantially upright, in-line food items in a radiant heat producing toaster, comprising:

a) a trough providing support for bottom end of a plurality of substantially upright, in-line food items and for catching by-products when said package is used in a toaster, wherein said trough is made of an absorbent paper-like material to absorb the by-products;

b) a handle made of a paper-like material, said handle connected to said trough;

c) a retainer providing support for upper end of the food items, said retainer made of a paper-like material, said retainer connected to said handle above said trough, said retainer having an opening through which upper ends of the plurality of substantially upright, in-line food items extend, said retainer and said handle being oriented such that an upright plane of edges of said retainer and said handle are substantially parallel to the plane of a radiant heat source in the toaster, said retainer and said handle constructed from a material having a thickness between about 0.01 centimeters and about 0.05 centimeters which is thick enough to provide structural integrity and thin enough to minimize the amount of radiant heat absorbed by said retainer and said handle thus reducing the risk of combustion of said package while maximizing the percent area of the plurality of substantially upright, in-line food items exposed to the radiant heat source thus providing uniform browning of the food items.

15. The package of claim 14, wherein said handle and said retainer have an aspect ratio between about 30 and about 160.

16. The food items of claim 14, wherein the food items may be selected from the group consisting of French fries, fried zucchini sticks, fried potato sticks, fried cheese sticks, fried shrimp.

17. A package for heating a plurality of substantially upright, in-line food items in a toaster, comprising:

a) a trough providing support for bottom end of a plurality of substantially upright, in-line food items and for catching by-products when said package is used in a toaster, wherein said trough is made of an absorbent paper-like material to absorb the by-products;

b) a handle made of a paper-like material, said handle connected to said trough;

c) a retainer providing support for upper end of the food items, said retainer made of a paper-like material, said retainer connected to said handle above said trough, said retainer having an opening through which upper ends of the plurality of substantially upright, in-line food items extend, said retainer and said handle being oriented such that an upright plane of edges of said retainer and said handle are substantially parallel to the plane of a radiant heat source in the toaster, said retainer and said handle constructed from a material having a thickness between about 0.01 centimeters and about 0.05 centimeters which is thick enough to provide structural integrity and thin enough to minimize the amount of radiant heat absorbed by said retainer and said handle thus reducing the risk of combustion of said package while maximizing the percent area of the plurality of substantially upright, in-line food items exposed to the radiant heat source thus providing uniform browning of the food items.

18. The package of claim 17, wherein said handle and said retainer have an aspect ratio between about 30 and about 160.

19. The food items of claim 17, wherein the food items may be selected from the group consisting of French fries, fried zucchini sticks, fried potato sticks, fried cheese sticks, fried shrimp.

* * * * *